United States Patent Office 3,065,127
Patented Nov. 20, 1962

3,065,127
PESTICIDAL ACRYLONITRILE REACTION
PRODUCTS
Samuel Allen Heininger, St. Louis, Mo., and Gail H.
Birum, Dayton, Ohio, assignors to Monsanto Chemical
Company, St. Louis, Mo., a corporation of Delaware
No Drawing. Original application Oct. 16, 1957, Ser.
No. 690,423, now Patent No. 2,993,037, dated July
18, 1961. Divided and this application Dec. 22, 1960,
Ser. No. 77,486
6 Claims. (Cl. 167—22)

This invention provides novel compositions of matter obtained by reaction of acrylonitrile with sulfur monochloride. The invention also provides biological toxicants in which said compositions are employed as the essential toxicant ingredients.

According to the invention, the presently provided novel reaction products are prepared by simply contacting sulfur monochloride with at least two molar equivalents of acrylonitrile, and allowing the resulting mixture to stand at ordinary or increased temperatures until reaction is completed. This can be readily ascertained, e.g., by noting cessation in change of color and/or viscosity and/or refractive index of the reaction mixture. The present reaction products are believed to be mixtures of organic, sulfur-containing chloro-nitriles and diverse decomposition products thereof. The reaction mixture components are difficult to separate, but the presently provided complex reaction products are of intrinsic utility, e.g., as microbiological toxicants, etc.

It is believed that the reaction of sulfur monochloride with two molar equivalents of acrylonitrile probably proceeds with the primary formation of isometric chloro cyano disulfides, thus:

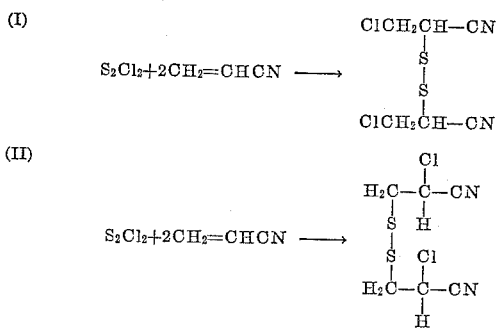

Some of the product of (I) and/or (II) may decompose as reaction proceeds to give a chloro cyano monosulfide, thus:

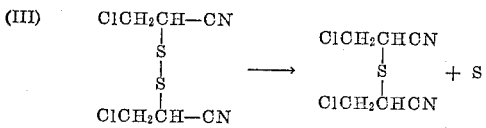

Either the chloro cyano disulfides or the chloro cyano monosulfides may undergo some dehydrochlorination.

The identity of any one of the possible isomeric chloro cyano disulfides or sulfides or their dehydrohalogenation products has proved impossible to establish; hence, we do not wish to be bound by the above speculative structures.

That the present products result from the reaction of one mole of the sulfur monochloride with two moles of acrylonitrile is evident from consumption of these reactants in the 1:2 ratio. Thus, the reaction product obtained by heating, at, say, 50° C. to 60° C. a mixture of one mole of sulfur monochloride and two moles of acrylonitrile has a boiling point and refractive index above that of either said monochloride or said nitrile, and analyses by both physical and chemical methods show the presence in said reaction product of the elements chlorine and sulfur and of the cyano (—CN) radical. We have found, on the other hand, that when one mole of sulfur monochloride is treated under the same conditions with only one mole—rather than two moles—of acrylonitrile, most of said monochloride is recovered unchanged, and the very small amount of higher boiling product which is obtained decomposes upon standing for a short time under atmospheric conditions.

Since formation of the present complex mixture of sulfur-containing nitriles consumes approximately two moles of acrylonitrile per mole of the sulfur monochloride, these reactants are advantageously present in stoichiometric proportions. However, an excess of the acrylonitrile may be used if desired to serve, e.g., as a reaction diluent. Extraneous inert solvents or diluents may likewise be employed. Such suitable materials include, e.g., carbon tetrachloride, chloroform, ethylene dichloride, dioxane, ether, etc. While the reaction will take place without application of external heat, it is accelerated by moderate heating. Temperatures of, say, 25° C. to 100° C., and preferably of from 40° C. to 100° C., are employed. The use of catalysts is generally not necessary, although acid catalysts and acidic reaction media may be employed. Since acrylonitrile is readily polymerizable, an inhibitor of polymerization may be included in the reaction mixture, particularly when operating at the higher temperatures. The reaction may also be facilitated by conducting it under superatmospheric pressure.

The time required to complete the reaction will depend, of course, on other operational conditions, e.g., temperature, pressure, presence or absence of diluent and/or catalyst, reactant quantities, details of apparatus, etc. The reaction may be conducted batch-wise or by continuous procedures.

Conveniently, the course of the reaction may be followed by observing the change in color of the reaction mixture. As the reaction proceeds, the color of the reaction mixture gradually darkens, usually changing from a clear yellow to a deep or brownish red by the time all of the sulfur monochloride is reacted. On completion of the reaction, the 2:1 acrylonitrile-sulfur monochloride reaction product may be isolated by conventional methods, e.g., by evaporation of any solvents, by washing and/or decantation to remove unreacted acrylonitrile, etc.

To the best of our knowledge, the presently provided reaction products of sulfur monochloride with acrylonitrile are complex mixtures of isomeric saturated and unsaturated sulfur-and chlorine-containing cyano compounds. The constituents are difficultly separable, and the composition of the present mixture of reaction products has not been precisely established. The presently obtained reaction products have bacteriostat and fungistat properties and are useful as the active constituents of microbiological toxicant compositions. As will be shown hereinafter, at concentrations of as low as, say, 10 p.p.m. they entirely prevent growth of a variety of bacteria and fungi. The reaction product of this invention can be used as a preservative, e.g., in leather, paper and fabrics, or in paints and varnishes to render them proof against mildew or fungus attack.

The present reaction products may further be used as nematocides, insecticides, herbicides, etc. They are also of utility as chemical intermediates whereby the cyano radical thereof is converted to the carboxylic —COOH radical, the chlorine radical replaced by other radicals, e.g., alkoxy, amino, phosphinyl, or phosphato radicals, and the sulfide or disulfide radicals converted by oxidation into sulfoxides or sulfones.

The present invention is further illustrated, but not limited, by the following examples:

*Example 1*

Into a 500 ml. flask, there was placed 138 g. (1.0 mole) of sulfur monochloride ($S_2Cl_2$), 150 ml. of carbon tetrachloride and 106 g. (2.0 moles) of acrylonitrile. The whole was heated with stirring, at a temperature of 60° C. for three hours, allowed to stand overnight at room temperature, and then heated again at 55–60° C. for one hour. Distillation of the resulting reaction mixture under partial vacuum to remove solvent and material boiling up to 34° C./0.2 mm., gave as residue 126 g. of a very viscous liquid which was converted to a red, resinous product upon cooling.

A portion of the resinous product was extracted with a benezene-hexane mixture and the resulting solution evaporated to dryness to give a benzene extract (A) and a benzene-insoluble portion (B). Infra-red analysis of (A) and (B) after evaporation of all solvents showed C≡N absorption at 2360 cm.$^{-1}$ for both (A) and (B). Also, for both (A) and (B) the —C—Cl linkage was indicated at about 720 cm.$^{-1}$. Elemental analyses showed the presence of chlorine and sulfur in both (A) and (B).

*Example 2*

To a mixture consisting of 138 g. (1.0 mole) of sulfur monochloride and 150 ml. of carbon tetrachloride, there was gradually added 106 g. (2.0 moles) of acrylonitrile. The whole was brought to a temperature of 55° C. and maintained at this temperature for 10 minutes. It was then allowed to stand overnight at room temperature and then heated again to 60–70° C. until evolution of some hydrogen chloride was noted. The reaction mixture was then cooled and the carbon tetrachloride stripped therefrom in vacuo to 50° C./13 mm. The residue was taken up with benzene and acetone and all solvents and unreacted sulfur monochloride were stripped off by distilling up to a pot temperature of 70° C./0.5–1.0 mm. There was thus obtained as residue 143 g. of the red, glassy 2:1 acrylonitrile-sulfur monochloride reaction product, soluble in benzene and insoluble in acetone and analyzing as follows:

| | |
|---|---|
| Percent C | 20.49 |
| Percent H | 1.51 |
| Percent Cl | 26.12 |
| Percent N | 7.24 |
| Percent S | 45.63 |

*Example 3*

This example describes microbiological evaluation of the 2:1 acrylonitrile-sulfur monochloride reaction product of Example 2.

A 1.0% solution of said reaction product was prepared in acetone and added to sterile melted nutrient agar to give an 0.1% (1 part of reaction product per 1,000 parts of agar) concentration of the test compound. This was further diluted with additional melted agar to give 1:10,000 and 1:100,000 dilutions of said reaction product in the agar. The various solutions were then respectively poured into Petri dishes and allowed to harden. Plates thus prepared were inoculated with the test organisms shown below and the inoculated plants were incubated for 48 hours at a temperature of 25° C. Inspection of the inoculated plates at the end of that time showed the lowest concentration at which no growth occurred to be 1:10,000 for the following organisms:

| | |
|---|---|
| *Streptococcus faecalis* ATCC 9790 | No growth |
| *Bacillus cereus* var. *mycoides* IPC 509 | No growth |
| *Cornyebacterium diphteriae* ATCC 296 | No growth |
| *Bacterium ammoniagenes* ATCC 6871 | No growth |
| *Erwinia atroseptica* ATCC 7404 | No growth |
| *Salmonella typhosa*—Hopkins Strain | No growth |
| *Aspergillus niger* IPC 144 | No growth |
| *Memnoniella echinata* ATCC 9597 | No growth |
| *Trichoderma sp.* T–1 ATCC 9645 | No growth |
| *Chaetomium globosum* USDA 1032.4 | No growth |
| *Aspergillus oryzae* ATCC 10196 | No growth |

The lowest concentration at which no growth occurred was 1:100,000 for the following organisms:

| | |
|---|---|
| *Micrococcus pyogenes* var. *aureus* ATCC 6538 | No growth |
| *Mycobacterium phlei*—St. Louis | No growth |
| *Proteus vulgaris*—Lambert | No growth |
| *Penicillium expansum* IPC 126 | No growth |
| *Trichophyton mentagrophytes* ATCC 9129 | No growth |
| *Fomes annosus* FPL 517 | No growth |
| *Hormiscium gelatinosum* FPL 595 | No growth |
| *Ceratostomella pilifera* ATCC 8713 | No growth |
| *Cladosporium herbarum* ATCC 6506 | No growth |
| *Alternaria tenuis* ATCC 11612 | No growth |
| *Myrothecium verrucaria* ATCC 9095 | No growth |
| *Bacillus subtilis*—Lambert | No growth |
| *Stemphylium sarcinaeforme*—U. of Ill | No growth |
| *Monolinia fructicola*—U. of Ill | No growth |
| *Pseudomonas phaseolicola*—USDA | No growth |

It will be readily seen from the above that the present acrylonitrile-sulfur monochloride reaction product is effective in suppressing the growth of both gram negative and gram positive bacteria as well as that of various fungi and molds. At concentrations which are somewhat higher than those required for the prevention of microbiological growth, the present 2:1 acrylonitrile-sulfur monochloride reaction products possess herbicidal and insecticidal activity.

When used either as microbiological toxicants or as insecticides or herbicides, the present reaction products are advantageously employed in the form of suspensions or emulsions. Since the reaction products are effective bacteriostats and fungistats when employed in very small concentrations, commercial toxicants comprising the reaction products may contain only minor proportions thereof. Oil-in-water emulsions containing, say, from 0.001% to 0.1% by weight of the present reaction products based on the total weight of the emulsion are useful. The word "oil" is here used to designate any organic liquid which is insoluble in water. Emulsifying agents which may be employed are those used in the art for the preparation of oil-in-water emulsions, e.g., long-chained alkylbenzenesulfonates, polyalkylene glycols, long-chain alkyl sulfosuccinates, etc. For these and related biological toxicant purposes, the reaction products may be incorporated into inert carriers generally. Thus they may be mixed with solid carriers such as clay, talc, pumice and bentonite to give toxicants dusts. We have found, however, that the emulsions possess an improved tendency to adhere to the treated surfaces so that less of the active ingredient, i.e., the acrylonitrile-sulfur monochloride reaction product, is required when applied in the emulsion form.

This application is a division of our copending application, Serial No. 690,423, filed October 16, 1957, now U.S. Patent No. 2,993,037.

What we claim is:

1. A composition effective against bacteria and fungi comprising an oil-in-water emulsion of a complex mixture of compounds containing carbon, hydrogen, sulfur, chlorine and cyano radicals, said mixture having been obtained by the reaction of one mole of sulfur monochloride with two moles of acrylonitrile at a temperature of 25° C. to 100° C.

2. A composition effective against bacteria comprising an oil-in-water emulsion of a bacteriostatic quantity of a complex mixture of compounds containing carbon, hydrogen, sulfur, chlorine and cyano radicals, said mixture having been obtained by the reaction of one mole of sulfur monochloride with two moles of acrylonitrile at a temperature of 25° C. to 100° C.

3. A composition effective against fungi comprising an oil-in-water emulsion of a fungistatic quantity of a complex mixture of compounds containing carbon, hydrogen, sulfur, chlorine and cyano radicals, said mixture having been obtained by the reaction of one mole of sulfur monochloride with two moles of acrylonitrile at a temperature of 25° C. to 100° C.

4. The method of inhibiting the growth of fungi and bacteria which comprises exposing them to a growth-inhibiting quantity of a composition comprising as the essential effective ingredient a complex mixture of compounds containing carbon, hydrogen, sulfur, chlorine and cyano radicals, said mixture having been obtained by the reaction of one mole of sulfur monochloride with two moles of acrylonitrile at a temperature of 25° C. to 100° C.

5. The method of inhibiting the growth of fungi which comprises exposing them to a growth-inhibiting quantity of a composition comprising as the essential effective ingredient a complex mixture of compounds containing carbon, hydrogen, sulfur, chlorine and cyano radicals, said mixture having been obtained by the reaction of one mole of sulfur monochloride with two moles of acrylonitrile at a temperature of 25° C. to 100° C.

6. The method of inhibiting the growth of bacteria which comprises exposing them to a growth-inhibiting quantity of a composition comprising as the essential effective ingredient a complex mixture of compounds containing carbon, hydrogen, sulfur, chlorine and cyano radicals, said mixture having been obtained by the reaction of one mole of sulfur monochloride with two moles of acrylonitrile at a temperature of 25° C. to 100° C.

No references cited.